United States Patent [19]

Kitazawa et al.

[11] Patent Number: 5,645,629

[45] Date of Patent: Jul. 8, 1997

[54] CALCINED PENCIL LEADS AND METHOD OF MANUFACTURING THE SAME

[75] Inventors: Katsunori Kitazawa, Takasaki; Kazutaka Aoki, Iwata, both of Japan

[73] Assignee: Mitsubishi Pencil Kabushiki Kaisha, Tokyo, Japan

[21] Appl. No.: 554,479

[22] Filed: Nov. 7, 1995

[30] Foreign Application Priority Data

Nov. 17, 1994 [JP] Japan ................................ 6-283058
Nov. 17, 1994 [JP] Japan ................................ 6-283059
Nov. 17, 1994 [JP] Japan ................................ 6-283060

[51] Int. Cl.$^6$ ........................... C09D 13/00; B43K 19/18
[52] U.S. Cl. ........................................................ 106/31.11
[58] Field of Search ................................ 106/19 B, 19 A

[56] References Cited

U.S. PATENT DOCUMENTS 2,566,753  9/1951  Van Dusen Jr. et al. ............. 106/19 B
5,346,540  9/1994  Schlennert ............................ 106/19 B

FOREIGN PATENT DOCUMENTS 034045  9/1974  Japan .

*Primary Examiner*—Helene Klemanski
*Attorney, Agent, or Firm*—Darby & Darby

[57] ABSTRACT

There are herein disclosed calcined pencil leads which have a high strength, excellent light resistance and weathering resistance as well as a sharp color and which can easily be erased by an eraser, and a method of manufacturing the calcined pencil leads.

In the calcined pencil leads containing, as at least a colorant, a pigment obtained by forming the pigment in the open cells of the pencil leads, the pigment can be obtained by any of (1) a process of impregnating the open cells with a solution containing the dissolved organic pigment, and then solidifying the pigment, (2) a process of impregnating the open cells with a solution containing a pigment precursor, and then reacting it, and (3) a process of impregnating the open cells with a dye solution, and then forming a lake.

12 Claims, No Drawings

CALCINED PENCIL LEADS AND METHOD OF MANUFACTURING THE SAME

BACKGROUND OF THE INVENTION (i) Field of the Invention

The present invention mainly relates to pencil leads for mechanical pencils and wood-cased pencils. More specifically, it relates to color pencil leads which have excellent light resistance and weathering resistance and which always hold a sharp color and which can be easily erased by an eraser while keeping strength as calcined pencil leads, and it also relates to a method of manufacturing the color pencil leads.

(ii) Description of the Related Art

Conventional pencil leads can be roughly classified into four kinds of pencil leads which can be obtained by four different manufacturing methods, but any kind of pencil leads have some drawbacks.

(1) The pencil leads obtained by kneading, molding and then calcining a material comprising, as main components, graphite as a colorant, an organic substance and/or clay as a binder.

The pencil leads obtained by this method are known as pencil leads which have practical strength enough to be used in mechanical pencils and which can be erased by an eraser. However, this method has a drawback that in view of the employment of graphite and the color of the calcined carbon substance, it is impossible to manufacture the leads other than the black leads.

(2) The non-calcined pencil leads obtained by kneading and then molding a wax, a binder, a filler, a pigment and the like.

According to this method, many kinds of organic pigments can be used, and the color pencil leads which have light resistance, weathering resistance and a sharp color can be obtained.

However, in the non-calcined pencil leads obtained by this method, the binding of the respective components depends upon the binding power of the organic binder, and therefore the strength of the pencil leads is insufficient to use in the mechanical pencils, and since the wax is included, lines drawn by these pencil leads cannot be erased by an eraser.

(3) The non-calcined pencil leads obtained by kneading and molding a water/oil repellent substance, a binder, a filler, a pigment and the like, and then impregnating open cells formed around the water/oil repellent substance with an oil or the like.

According to this preparation method, the color pencil leads which can be erased by an eraser as easily as the pencil leads of the above-mentioned (1) can be prepared in the case that an oil or the like which is liquid at ordinary temperature is selected as the oil for the impregnation. However, when it is attempted to prepare the color pencil leads having a sharp hue by using an organic pigment, the usable binders are limited to organic polymeric substances owing to the heat resistance of the pigment. In consequence, the strength of the obtained pencil leads is insufficient to use in the mechanical pencils or the like.

(4) The pencil leads obtained by kneading, molding and then calcining boron nitride, clay, an organic substance and the like to obtain light-colored or white porous pencil leads, and then impregnating them with a dye-containing ink.

Lines drawn by the pencil leads obtained by this method can be erased by an eraser. However, since a pigment which has the sharp hue and a high heat-resistant temperature and which is harmless to humans and usable in the pencil leads is not present, the dye with which the calcined pencil leads can be impregnated is used as a colorant. Thus, the pencil leads obtained by this method are noticeably poorer in light resistance and weathering resistance as compared with the pigment leads of the above-mentioned (2) and (3). If the pencil leads having large cells therein are formed, it is possible to impregnate them with a pigment-dispersing ink, but in the pencil leads obtained in such a manner, the strength is low, so that the pencil leads cannot be used for the mechanical pencils.

SUMMARY OF THE INVENTION

Under such circumstances, the present invention has been intended to overcome the drawbacks of conventional pencil leads and conventional manufacturing methods of them, and an object of the present invention is to provide calcined pencil leads which can keep sufficient strength, can give a sharp color, permits drawn lines to have excellent light resistance and weathering resistant, and can draw lines erasable by an eraser.

The present inventors have intensively researched, and as a result, they have succeeded in obtaining the desired pencil leads by preparing a calcined white porous leads, and then impregnating the open cells of the calcined porous leads with a pigment as a colorant by any of the undermentioned procedures. In consequence, the present invention has been completed.

Specifically, the present invention comprises the step of impregnating open cells of white porous pencil leads with (i) a pigment solution prepared by dissolving a pigment in an organic solvent or an acid or an alkali solution, and then solidifying the pigment as a colorant in the cells by a means such as a water deposition method, a neutralization method or a solvent evaporation method, (ii) a solution containing a pigment precursor, and then reacting the pigment precursor to form a pigment, or (iii) a dye solution and a precipitant solution, and then carrying out a lake forming reaction to form a pigment, thereby obtaining calcined pencil leads having a high saturation and a sharp color like conventional non-calcined color pencil leads.

The pencil leads of the present invention are different from leads obtained only by impregnating conventional white porous pencil leads with a dye ink, and are excellent in light resistance and weathering resistance because of containing the pigment as the colorant.

Furthermore, the pencil leads of the present invention contain no wax in contrast to the conventional non-calcined pencil leads, so that they are excellent in erasability by an eraser. In the present invention, since the pigment is formed after the calcination, the heat-resistant temperature of the pigment is not limited, so that the calcination can be carried out at a high temperature to obtain the color pencil leads having a high strength.

DESCRIPTION OF THE PREFERRED EMBODIMENTS

The present invention is directed to calcined pencil leads in which open cells are impregnated with, as a colorant, at least one of a dissolved and then solidified organic pigment, a pigment obtained by subjecting a pigment precursor to a pigment forming reaction, and a pigment obtained by forming the lake of a dye with a precipitant. In particular, the present invention is directed to calcined pencil leads having a high strength for mechanical pencils in which open cells are impregnated with, as a colorant, at least one of the above-mentioned pigments.

A method of manufacturing the calcined pencil leads comprises the steps of preparing uncolored calcined pencil leads having open cells, and impregnating these open cells with (i) a pigment solution prepared by dissolving an organic pigment in at least one solution selected from the group consisting of an organic solvent, an acid solution and an alkali solution, and then solidifying the organic pigment as a colorant in the cells by at least one means selected from the group consisting of a solvent evaporation method, a poor solvent replacement method for the pigment inclusive of water deposition and a neutralization method, (ii) a solution containing a pigment precursor, and then reacting the pigment precursor in the open cells to form a pigment as the colorant, or (iii) a dye solution and a precipitant solution, and then carrying out a lake forming reaction to form a pigment as the colorant.

No particular restriction is put on the shape, structure and manufacturing procedure of porous pencil leads which can be used in the present invention, and any pencil leads can be used, so long as they possess open cells having such a size that the formation of the pigment can be done in the open cells.

In order to exert the features of the present invention, the calcined porous pencil leads which can hold a high strength are desirable, and this kind of calcined porous pencil leads are particularly useful for the pencil leads having a small diameter of 1.0 mm or less for mechanical pencils. Examples of the calcined porous pencil leads are light-colored or white porous pencil leads obtained by kneading, molding and calcining boron nitride, clay, an organic substance and the like.

In the case that the pigment is dissolved in an acid solution or an alkali solution, it is necessary, needless to say, to select the leads which are excellent in acid resistance or alkali resistance.

The minimum size of the open cells in which the formation of the pigment can be performed is considered to be about 0.1 µm, and therefore it is desirable that all the open cells have diameters of 0.1 µm or more. However, in consideration of the size distribution of the open cells, if the open cells are partially distributed in a range of less than 0.1 µm, any organic pigment is not contained in the open cells having diameters of less than 0.1 µm. Alternatively, even if contained, the organic pigment is incompletely contained therein. As a result, color developing properties are poor, and light resistance and weathering resistance are also low. Accordingly, the ratio of the open cells having diameters of less than 0.1 µm should be limited to 40% or less by volume, preferably 20% or less by volume of the total open cells.

The maximum diameter of the open cells is preferably 0.5 µm. Needless to say, the formation of the pigment is possible even in the open cells having diameters of more than 0.5 µm, but when the size of the open cells is more than required, the desired strength which is necessary for writing can scarcely be attained, and if the strength is heightened, a writing feeling is bad and scratchy.

Furthermore, in consideration of coloring properties on papers, the porosity of the porous pencil leads is desirably such that the ratio of the open cells having diameters of 0.1 µm to 0.5 µm is preferably 7% or more, more preferably 12% or more.

In particular, according to the manufacturing method of the present invention, the lead bases are calcined and the pigment is then formed in the open cells, and therefore the present invention is characterized in that a high calcination temperature can be selected irrespective of the heat-resistant temperature of the pigment to heighten the strength. The leads which require this process most strongly are color pencil leads for mechanical pencils. In this case, in consideration of the strength, the porosity of the porous pencil leads is preferably such that the ratio of the open cells having diameters of 0.1 µm to 0.3 µm is preferably 70% or more, more preferably 90% or more by volume.

With regard to the color of the porous pencil leads, in the case that the bright color pencil leads having a high chroma are manufactured, the white leads must be used, but in the case that the deep-tone color pencil leads having a low chroma are manufactured, the porous leads containing a heat-resistant inorganic pigment such as red iron oxide which is harmless to humans may be used.

In addition, the formation of the pigment may be carried out in the open cells of conventional black leads containing graphite to manufacture reddish black or bluish black pencil leads.

Typical examples of the organic pigment which can be used for the solidification in the open cells in the present invention include monoazo pigments, polyazo pigments, copper phthalocyanine pigments, and condensed polycyclic pigments such as quinacridone pigments, anthraquinone pigments, indigo pigments, perylene, perinone pigments and quinophthalone pigments.

An organic pigment solution can be prepared by dissolving an organic pigment in an organic solvent, an acid solution, an alkali solution or a combination thereof, but it is preferably prepared by dissolving the organic pigment in sulfuric acid or an organic solvent in the presence of an alkali.

As techniques for solidifying the organic pigment in the organic pigment solution with which the open cells are impregnated, there can be employed a poor solvent method in which the open cells are impregnated with the so-called poor solvent which dissolves the organic pigment less than the organic solvent dissolving the organic pigment to deposit the organic pigment, a water deposition method in which the open cells are impregnated with water to deposit the organic pigment, a neutralization method in which when the organic pigment is dissolved in an acid, the open cells are impregnated with an alkali solution, or when the organic pigment is dissolved in an alkali, the open cells are impregnated with an acid solution to neutralize the organic pigment solution, thereby depositing the organic pigment, and an evaporation method in which the organic solvent is evaporated by heating. In view of the state of the solution, at least one of these solidification methods is selected and used.

Examples of a pigment precursor which can be used in the present invention include conventional known base components and coupling components for use in the preparation of azo pigments. No particular restriction is put on kinds of base components and coupling components, and any components can be used, so far as they can be used to impregnate the open cells of the pencil leads.

Examples of the base components include anthranilic acid, sulfanilic acid, 2-chloro-5-toluidine-4-sulfonic acid, p-toluidine-m-sulfonic acid, 2-naphthylamine-1-sulfonic acid, 4-nitro-2-toluidine, 3-nitro-4-toluidine, 4-chloro-2-nitroaniline, 4-carbonylamino-2-anisidine, 2,4,5-trichloroaniline, 3-amino-4-methoxy-2'-methyl-3'-chlorobenzanilide, 4-benzoylamino-5-methyl-2-methoxyaniline, 3,3'-dichlorobenzidine and dianisidine.

Preferably, each of these base components is diazotized in a usual manner to prepare a diazo solution, and this diazo solution is then used to impregnate the open cells therewith.

On the other hand, examples of the coupling components include β-naphthol, β-oxynaphthoic acid, 2-naphthol-6-sulfonic acid, 2-hydroxynaphthalene-3-carbonylanilide, 2-hydroxynaphthalene-3-carbonyl-4'-chloroanilide, 2-hydroxynaphthalene-3-carbonyl-2'-methylanilide, 2-hydroxynaphthalene-3-carbonylamide, 1-phenyl-3-methyl-5-pyrazolone, acetoacetoanilide and acetoaceto-p-toluidide.

From each of these coupling components, a prime immersion solution is prepared, and this prime immersion solution is then used to impregnate the open cells therewith.

In the present invention, the pigment can be prepared, for example, by obtaining an aqueous slurry of a base component such as the aromatic amine at a concentration of about 1 to 10%, acidifying the aqueous slurry with an equimolar or more acid such as hydrochloric acid, adding equimolar sodium nitrite to the slurry to form a diazo compound, thereby preparing a diazo solution, and then carrying out a coupling reaction between this diazo solution and the separately prepared prime immersion solution (the coupling component) to obtain the pigment.

The manufacturing method of the pencil leads of the present invention is characterized by forming the pigment in the open cells of the pencil leads. Preferably, the open cells are first impregnated with either of the diazo solution and the prime immersion solution, and they are then impregnated with the prime immersion solution or the diazo solution to carry out the coupling reaction, if necessary, in the presence of a metallic salt, to manufacture the pencil leads.

Examples of the dye which can be used in the present invention include conventional known acid dyes, basic dyes and direct dyes which can be introduced into the open cells and can form lakes by action of a precipitant such as a metallic salt.

Typical examples of the dye include Eosine, Acid Phloxine, Tartrazine Yellow, Quinoline Yellow, Rhodamine B, Rhodamine 6GCP, Auramine, Basic Flavine, Malachite Green, Diamond Green, Victoria Blue, Methyl Violet, sulfonated copper Phthalocyanine Blue, Peacock Blue and azo dyes which are known as the precursors of azo lake pigments.

On the other hand, examples of the precipitant which can be used in the present invention include chlorides, sulfates and acetates of alkaline earth metals, aluminum and lead, synthesized tannins such as tannic acid, Catanol and Tamol, complex acids such as phosphotungstic acid, phosphomolybdic acid, phosphotungstic-molybdic acid, and organic amines.

The manufacturing method of the pencil leads of the present invention is characterized by forming the lake of the dye in the open cells of the pencil leads to obtain the pigment. Thus, the open cells are first impregnated with either of the dye or the precipitant, and they are then impregnated with the precipitant or the dye to carry out a lake forming reaction, whereby the pigment is prepared and consequently the pencil leads are manufactured.

Furthermore, a surface active agent and other additives can be used as an accelerator for the impregnation of the pigment, a coupling reaction auxiliary and a lake forming reaction auxiliary, and the impregnation can also be accelerated by heating, or the reduction or increase of pressure.

The open cells in which the formation of the pigment has already been completed can be further impregnated repeatedly with the pigment material solution to form the pigment, whereby a desired color can be made deeper.

Moreover, the open cells in which the pigment has already been formed can be further impregnated with a dye ink having a color similar to and/or a color different from the color of the pigment formed in the open cells to complement or mix the colors. By the utilization of a fact that the dye has a low light resistance, the pencil leads in which a color changes into another by light can also be manufactured.

In addition, the open cells can be impregnated with an oil or the like so as to improve lubricating properties at the time of writing.

In order that drawn lines may be erased by an eraser as easily as in calcined graphite leads, an oil and/or a wax which is liquid at ordinary temperature must be selected and used. Typical examples of the oil and the wax include silicone oil, mineral oils, liquid paraffins and α-olefin oligomers and the like.

EXAMPLES

The present invention will be described in more detail with reference to examples, but the scope of the present invention should not be limited to these examples at all.

Example 1

| Synthesized kaolinite | 35 wt % |
|---|---|
| Boron nitride | 40 wt % |
| Polyvinyl alcohol | 18 wt % |
| Polyethylene glycol | 7 wt % |

The above-mentioned blended composition and the equal weight of water were mixed and dispersed in a mixer, and the water content of the mixture was then regulated, while it was kneaded by a twin roll. Afterward, the thus kneaded material was extruded by a plunger type extruder, and then dried at 100° C. for 10 hours. Next, the molded articles were heated up to 1100° C. in an argon gas atmosphere, and then calcined at 1100° C. for 1 hour. Furthermore, they were heated up to 700° C., and then calcined at 700° C. for 5 hours to obtain calcined white porous pencil leads having a diameter of 0.570 mm.

The thus obtained porous pencil leads were immersed for 24 hours in a pigment solution obtained by dissolving 14 wt. % of C. I. Pigment Blue 15:3 (a copper phthalocyanine pigment) in 86 wt. % of 98% sulfuric acid to impregnate the open cells of the pencil leads with the pigment solution. Afterward, the pencil leads were immersed for 12 hours in water to solidify the pigment, followed by neutralization, water washing and drying, to obtain calcined blue pencil leads having a diameter of 0.570 mm.

Example 2

The same procedure as in Example 1 was carried out except that a copper phthalocyanine pigment was replaced with C. I. Pigment Red 122 (a quinacridone pigment), to obtain calcined red pencil leads having a diameter of 0.570 mm.

Example 3

The same calcined white porous pencil leads as in Example 1 were immersed for 12 hours in a pigment solution obtained from 8 wt. % of C. I. Pigment Red 22 (a monoazo pigment), 80 wt. % of dimethyl sulfoxide and 12 wt. % of a 25% aqueous caustic soda solution to impregnate the open cells of the pencil leads with the pigment solution. Afterward, the pencil leads were immersed for 12 hours in a 1% aqueous hydrochloric acid solution to solidify the pigment, followed by water washing and drying, to obtain calcined red pencil leads having a diameter of 0.570 mm.

Example 4

The same steps of pigment solution impregnation, solidification, water washing and drying as in Example 3 were repeated three times to obtain calcined red pencil leads having a diameter of 0.570 mm.

Example 5

The same calcined white porous pencil leads as in Example 1 were immersed for 12 hours in a pigment solution obtained from 5 wt. % of C. I. Pigment Yellow 12 (a disazo pigment), 85 wt. % of dimethyl sulfoxide and 10 wt. % of a 25% aqueous caustic soda solution to impregnate the open cells of the pencil leads with the pigment solution. Afterward, the pencil leads were immersed for 12 hours in water to solidify the pigment, followed by neutralization, water washing and drying, to obtain calcined yellow pencil leads having a diameter of 0.570 mm.

Example 6

The same calcined white porous pencil leads as in Example 1 were immersed at 50° C. for 3 hours in a 5% aqueous solution (a prime immersion solution) obtained by dissolving 2-hydroxynaphthalene-3-carbonylanilide together with caustic soda with heating, and the pencil leads were then immersed at 5° C. for 3 hours in a 3.5% aqueous solution (a dizao solution) obtained by diazotizing 4-carbonylamino-2-anisidine in a usual manner to form C. I. Pigment Red 245 in the open cells. Next, these pencil leads were heated at 90° C. for 30 minutes, washed with water, and then dried to obtain calcined red pencil leads having a diameter of 0.570 mm.

Example 7

Calcined white porous pencil leads prepared by the same procedure as in Example 1 were repeatedly subjected to an impregnation step and a pigment formation step of Example 6 three times to obtain calcined red pencil leads having a diameter of 0.570 mm.

Example 8

The same calcined white porous pencil leads as in Example 1 were immersed at 50° C. for 3 hours in a 5% aqueous solution (a prime immersion solution) obtained by dissolving 2-hydroxynaphthalene-3-carbonylanilide together with caustic soda with heating, and the pencil leads were then immersed at 5° C. for 3 hours in a 3% aqueous solution (a dizao solution) obtained by diazotizing 4-nitro-2-toluidine in a usual manner to form C. I. Pigment Red 22 in the open cells. Next, these pencil leads were heated at 90° C. for 30 minutes, washed with water, and then dried to obtain calcined red pencil leads having a diameter of 0.570 mm.

Example 9

The same calcined white porous pencil leads as in Example 1 were immersed at 10° C. for 5 hours in a 5% aqueous solution obtained by tetrazotizing 3,3'-dichlorobenzidine, and the pencil leads were then immersed at 20° C. for 3 hours in a 10% prime immersion solution obtained by dissolving acetoacetoanilide and caustic soda in a mixed solution of methanol and water (methanol/water= 8/2), and then adding acetic acid thereto for acidification, thereby forming C. I. Pigment Yellow 12 in the open cells. Next, these pencil leads were heated at 90° C. for 30 minutes, washed with water, and then dried to obtain calcined yellow pencil leads having a diameter of 0.570 mm.

Example 10

The same calcined white porous pencil leads as in Example 1 were immersed at 20° C. for 3 hours in a 5% prime immersion solution obtained by dissolving β-oxynaphthoic acid and rosin (40 wt. % based on the weight of β-oxynaphthoic acid) in methanol and then adding an aqueous caustic soda solution (methanol/water=9/1 by weight), and the pencil leads were then immersed at 5° C. for 6 hours in a 1% diazo solution obtained by diazotizing p-toluidine-m-sulfonic acid in a usual manner and then adding calcium chloride (1.5 mols relative to 1 mol of p-toluidine-m-sulfonic acid) and methanol (methanol/ water=6/4 by weight) to form C. I. Pigment Red 57:1 in the open cells. Next, these pencil leads were heated at 80° C. for 30 minutes in water, washed with water, and then dried to obtain calcined red pencil leads having a diameter of 0.570 mm.

Example 11

The same calcined white porous pencil leads as in Example 1 were immersed at 30° C. for 5 hours in a 5% aqueous solution obtained by dissolving di-sulfonated copper Phthalocyanine Blue together with caustic soda, to impregnate the open cells of the pencil leads with the dye solution. Afterwards, the pencil leads were immersed at 50° C. for 5 hours in a barium chloride aqueous solution, thereby forming C. I. Pigment Blue 17:1 in the open cells. Next, these pencil leads were heated at 80° C. for 30 minutes in water, washed with water, and then dried to obtain calcined light-blue pencil leads having a diameter of 0.570 mm.

Example 12

The same calcined white porous pencil leads as in Example 1 were repeatedly subjected to an impregnation step and a lake formation step of Example 11 three times to obtain calcined light-blue pencil leads having a diameter of 0.570 mm.

Example 13

The same calcined white porous pencil leads as in Example 1 were immersed at 80° C. for 3 hours in a 5% aqueous solution obtained by dissolving Rhodamine 6GCP together with acetic acid with heating to impregnate the open cells of the pencil leads with the dye solution, and the pencil leads were further immersed at 60° C. for 5 hours in a sulfuric acid-acidified aqueous phosphotungstic-molybdic acid solution, thereby forming C. I. Pigment Rose 81 in the open cells. Next, these pencil leads were heated at 80° C. for 30 minutes in water, washed with water, and then dried to obtain calcined pink pencil leads having a diameter of 0.570 mm.

Example 14

The same calcined white porous pencil leads as in Example 1 were immersed at 80° C. for 3 hours in a 5% aqueous Methyl Violet solution to impregnate the open cells of the pencil leads with the dye solution, and the pencil leads were further immersed at 60° C. for 5 hours in a sulfuric acid-acidified aqueous phosphomolybdic acid solution, thereby forming C. I. Pigment Violet 3 in the open cells. Next, these pencil leads were heated at 80° C. for 30 minutes in water, washed with water, and then dried to obtain calcined violet pencil leads having a diameter of 0.570 mm.

Example 15

The same calcined white porous pencil leads as in Example 1 were immersed at 80° C. for 3 hours in a 5% aqueous Methyl Violet solution to impregnate the open cells of the pencil leads with the dye solution, and the pencil leads were further immersed at 80° C. for 5 hours in an aqueous tannic acid solution, thereby forming C. I. Pigment Violet 3 in the open cells. Next, these pencil leads were heated at 80° C. for 30 minutes in water, washed with water, and then dried to obtain calcined violet pencil leads having a diameter of 0.570 mm.

Example 16

The same calcined white porous pencil leads as in Example 1 were immersed at 5° C. for 6 hours in a 1% aqueous solution obtained by adding a rosin soap (25 wt. % based on the weight of the dye) to a dye soda salt prepared by carrying out a coupling reaction between p-toluidine-m-sulfonic acid and β-oxynaphthoic acid, and the pencil leads were further immersed at 5° C. for 6 hours in an aqueous calcium chloride solution, thereby forming C. I. Pigment Red 57:1 in the open cells. Next, these pencil leads were heated at 80° C. for 30 minutes in water, washed with water, and then dried. Moreover, these steps were repeated twice to obtain calcined red pencil leads having a diameter of 0.570 mm.

Comparative Example 1

The same calcined white porous pencil leads as in Example 1 were impregnated with an ink for ball point pens comprising C. I. Solvent Blue 70, thereby obtaining calcined blue pencil leads having a diameter of 0.570 mm.

Comparative Example 2

The same calcined white porous pencil leads as in Example 1 were impregnated with an ink for ball point pens comprising C. I. Solvent Red 8, thereby obtaining calcined red pencil leads having a diameter of 0.570 mm.

Comparative Example 3

The same calcined white porous pencil leads as in Example 1 were impregnated with an ink for ball point pens comprising C. I. Solvent Yellow 21, thereby obtaining calcined yellow pencil leads having a diameter of 0.570 mm.

Comparative Example 4

The same calcined white porous pencil leads as in Example 1 were impregnated with an aqueous ink comprising C. I. Acid Blue 1, thereby obtaining calcined blue pencil leads having a diameter of 0.570 mm.

Comparative Example 5

The same calcined white porous pencil leads as in Example 1 were impregnated with an aqueous ink comprising C. I. Basic Red 1 (Rhodamine 6GCP), thereby obtaining calcined red pencil leads having a diameter of 0.570 mm.

Comparative Example 6

The same calcined white porous pencil leads as in Example 1 were impregnated with an aqueous ink comprising C. I. Basic Violet 1 (Methyl Violet), thereby obtaining calcined violet pencil leads having a diameter of 0.570 mm.

Comparative Example 7

| | |
|---|---|
| Cellulose nitrate | 30 wt % |
| Talc | 30 wt % |
| Calcium stearate | 20 wt % |
| Montan wax | 5 wt % |
| Copper phthalocyanine pigment (C.I. Pigment Blue 15:3) | 15 wt % |

To the above-mentioned blended composition was added the equal weight of methyl ethyl ketone, and they were then mixed and dispersed by a kneader. Afterward, the solvent content of the mixture was then regulated, while it was kneaded by a twin roll, and the thus kneaded material was pelletized, extruded by a plunger type extruder, and then dried at 50° C. for 60 hours to obtain non-calcined blue pencil leads having a diameter of 0.568 mm.

Comparative Example 8

| | |
|---|---|
| Cellulose nitrate | 30 wt % |
| Talc | 30 wt % |
| Calcium stearate | 20 wt % |
| Montan wax | 5 wt % |
| Insoluble diazo pigment (C.I. Pigment Red 22) | 15 wt % |

To the above-mentioned blended composition was added the equal weight of methyl ethyl ketone, and they were then mixed and dispersed by a kneader. Afterward, the solvent content of the mixture was then regulated, while it was kneaded by a twin roll, and the thus kneaded material was pelletized, extruded by a plunger type extruder, and then dried at 50° C. for 60 hours to obtain non-calcined red pencil leads having a diameter of 0.569 mm.

Comparative Example 9

| | |
|---|---|
| Cellulose nitrate | 30 wt % |
| Talc | 30 wt % |
| Calcium stearate | 20 wt % |
| Montan wax | 5 wt % |
| Soluble diazo pigment (C.I. Pigment Red 57:1) | 15 wt % |

To the above-mentioned blended composition was added the equal weight of methyl ethyl ketone, and they were then mixed and dispersed by a kneader. Afterward, the solvent content of the mixture was then regulated, while it was kneaded by a twin roll, and the thus kneaded material was pelletized, extruded by a plunger type extruder, and then dried at 50° C. for 60 hours to obtain non-calcined red pencil leads having a diameter of 0.568 mm.

For the respective color pencil leads obtained in Examples 1 to 16 and Comparative Examples 1 to 9, light resistance $\Delta L^*$ and erasability by an eraser were evaluated. The evaluation was made by the following procedures. The results are shown in Table 1.

Light resistance ($\Delta L^*$): Lines were drawn on a woodfree paper, and then irradiated with a xenon lamp for 6 hours. Afterward, a difference between lightness indexes of the drawn lines before and after the irradiation was measured. The smaller the difference $\Delta L^*$ between the lightness indexes is, the better the light resistance is.

Erasability: A case where lines drawn on a woodfree paper could easily be erased by an eraser was represented by o, and a case where the lines drawn on the paper could not be erased by the eraser was represented by x.

TABLE 1

| | Light Resistance $\Delta L^*$ | Erasability |
|---|---|---|
| Example 1 | 0.3 | o |
| Example 2 | 0.5 | o |
| Example 3 | 1.4 | o |
| Example 4 | 0.8 | o |
| Example 5 | 1.6 | o |
| Example 6 | 1.2 | o |
| Example 7 | 0.8 | o |
| Example 8 | 1.1 | o |
| Example 9 | 1.4 | o |
| Example 10 | 1.4 | o |
| Example 11 | 3.6 | o |
| Example 12 | 3.0 | o |
| Example 13 | 2.8 | o |

TABLE 1-continued

|  | Light Resistance ΔL* | Erasability |
| --- | --- | --- |
| Example 14 | 2.2 | o |
| Example 15 | 2.1 | o |
| Example 16 | 1.3 | o |
| Comp. Ex. 1 | 10.6 | o |
| Comp. Ex. 2 | 13.5 | o |
| Comp. Ex. 3 | 11.7 | o |
| Comp. Ex. 4 | 18.4 | o |
| Comp. Ex. 5 | 16.7 | o |
| Comp. Ex. 6 | 17.5 | o |
| Comp. Ex. 7 | 0.3 | x |
| Comp. Ex. 8 | 0.6 | x |
| Comp. Ex. 9 | 1.2 | x |

As is apparent from the results of Table 1, calcined color pencil leads containing as the colorants at least pigments synthesized in the open cells of the pencil leads of Examples 1 to 16 according to the present invention are excellent in light resistance and erasability.

On the contrary, with respect to the results of Comparative Examples 1 to 9, calcined color pencil leads containing dyes as the colorants in Comparative Examples 1 to 6 are poor in the light resistance, and calcined color pencil leads containing pigments as the colorants in Comparative Examples 7 to 9 are excellent in the light resistance but they are poor in the erasability. Thus, it is apparent that these calcined color pencil leads of Comparative Examples 1 to 9 cannot simultaneously meet the light resistance and the erasability.

What is claimed is:

1. Pencil leads containing in open cells of calcined pencil leads having open cells, as at least a colorant, any of
   (1) an organic pigment obtained by impregnating the open cells with a solution containing the organic pigment, and then solidifying the organic pigment in the open cells,
   (2) a pigment obtained by subjecting a pigment precursor to a pigment forming reaction in the open cells, and
   (3) a pigment obtained by forming a lake of a dye in the open cells by a precipitant.

2. The pencil leads according to claim 1 wherein the calcined pencil leads having the open cells are highly strong calcined pencil leads for mechanical pencils, wherein the ratio of the open cells having diameters from 0.1 to 0.3 μm is 70% or more by volume of the total open cells.

3. The pencil leads according to claim 1 wherein an organic pigment obtained by impregnating the open cells of the pencil leads with the solution containing the organic pigment, and then solidifying the organic pigment in the open cells is contained as at least the colorant in the open cells.

4. The pencil leads according to claim 3 wherein the calcined pencil leads having the open cells are highly strong calcined pencil leads for mechanical pencils, wherein the ratio of the open cells having diameters from 0.1 to 0.3 μm is 70% or more by volume of the total open cells.

5. The pencil leads according to claim 1 wherein the pigment obtained by subjecting the pigment precursor to the pigment forming reaction in the open cells is contained as at least the colorant in the open cells.

6. The pencil leads according to claim 5 wherein the calcined pencil leads having the open cells are highly strong calcined pencil leads for mechanical pencils, wherein the ratio of the open cells having diameters from 0.1 to 0.3 μm is 70% or more by volume of the total open cells.

7. The pencil leads according to claim 1 wherein the pigment obtained by forming the lake of the dye in the open cells by the precipitant is contained as at least the colorant in the open cells.

8. The pencil leads according to claim 7 wherein the calcined pencil leads having the open cells are highly strong calcined pencil leads for mechanical pencils, wherein the ratio of the open cells having diameters from 0.1 to 0.3 μm is 70% or more by volume of the total open cells.

9. A method for manufacturing pencil leads which comprises, after the formation of calcined pencil leads having open cells, a step of forming a pigment as a colorant in the open cells by any of
   (1) a process which comprises impregnating the open cells with an organic pigment solution prepared by dissolving a pigment in at least one solution selected from the group consisting of an organic solvent, an acid solution and an alkali solution, and then solidifying the pigment in the open cells by at least one means selected from the group consisting of a solvent evaporation method, a poor solvent replacement method for the pigment and a neutralization method,
   (2) a process which comprises impregnating the open cells with a solution containing a pigment precursor, and then reacting the pigment precursor in the open cells to form the pigment, and
   (3) a process which comprises impregnating the open cells with a dye solution and a precipitant solution, and then carrying out a lake forming reaction in the open cells.

10. The method for manufacturing pencil leads according to claim 9 which comprises, after the formation of calcined pencil leads having open cells, a step of forming a pigment as a colorant in the open cells by a process which comprises impregnating the open cells with an organic pigment solution prepared by dissolving a pigment in at least one solution selected from the group consisting of an organic solvent, an acid solution and an alkali solution, and then solidifying the pigment in the open cells by at least one means selected from the group consisting of a solvent evaporation method, a poor solvent replacement method for the pigment and a neutralization method.

11. The method for manufacturing pencil leads according to claim 9 which comprises, after the formation of calcined pencil leads having open cells, a step of forming a pigment as a colorant in the open cells by a process which comprises impregnating the open cells with a solution containing a pigment precursor, and then reacting the pigment precursor in the open cells to form the pigment.

12. The method for manufacturing pencil leads according to claim 9 which comprises, after the formation of calcined pencil leads having open cells, a step of forming a pigment as a colorant in the open cells by a process which comprises impregnating the open cells with a dye solution and a precipitant solution, and then carrying out a lake forming reaction in the open cells.

* * * * *